United States Patent [19]

Allen

[11] Patent Number: 5,649,206
[45] Date of Patent: Jul. 15, 1997

[54] PRIORITY ARBITRATION PROTOCOL WITH TWO RESOURCE REQUESTER CLASSES AND SYSTEM THEREFOR

[75] Inventor: Michael S. Allen, Austin, Tex.

[73] Assignee: Motorola, Inc., Schaumburg, Ill.

[21] Appl. No.: 482,955

[22] Filed: Jun. 15, 1995

Related U.S. Application Data

[63] Continuation of Ser. No. 116,633, Sep. 7, 1993, abandoned.

[51] Int. Cl.$^6$ ..................................................... G06F 13/14
[52] U.S. Cl. ........................... 395/729; 395/728; 395/293; 395/478; 370/462
[58] Field of Search .................................... 395/293, 294, 395/296, 728, 729, 732, 478; 340/825.5, 825.51; 370/85.1, 85.2, 85.6; 327/19

[56] References Cited

U.S. PATENT DOCUMENTS

| | | | |
|---|---|---|---|
| 4,633,394 | 12/1986 | Georgiou et al. | 395/650 |
| 4,785,394 | 11/1988 | Fischer | 395/294 |
| 4,814,974 | 3/1989 | Narayanan et al. | 364/200 |
| 4,924,380 | 5/1990 | McKinney et al. | 395/325 |
| 5,072,363 | 12/1991 | Gallagher | 395/725 |
| 5,088,024 | 2/1992 | Vernon et al. | 395/725 |
| 5,241,632 | 8/1993 | O'Connell et al. | 395/325 |
| 5,276,887 | 1/1994 | Haynie | 395/725 |
| 5,546,548 | 8/1996 | Chen et al. | 395/296 |

*Primary Examiner*—Gopal C. Ray
*Attorney, Agent, or Firm*—Lee E. Chastain

[57] ABSTRACT

An arbitration protocol (68) comprises the steps of receiving a first (70) and a second (74) plurality of resource request signals, and either, granting the shared resource to a selected one of a first plurality of resource users (72) or granting the shared resource to a selected one of a second plurality of resource users (76). A differing one of each of a first plurality of resource users and of each of a second plurality of resource users generates a differing one of the first plurality of resource request signals and a differing one of the second plurality of resource request signals, respectively. Each one of the first and the second plurality of resource request signals corresponds to a first logic state if a particular one of the first or second plurality of resource users requests use of a shared resource. The shared resource is granted to a selected one of the first plurality of resource users according to a first arbitration protocol if at least one of the first plurality of resource request signals corresponds to the first logic state. The shared resource is granted to a selected one of the second plurality of resource users according to a second arbitration protocol if none of the first plurality of resource request signals corresponds to the first logic state and at least one of the second plurality of resource request signals corresponds to the first logic state.

1 Claim, 5 Drawing Sheets

PRIORITY ARBITRATION PROTOCOL WITH TWO RESOURCE REQUESTER CLASSES AND SYSTEM THEREFOR

This application is a continuation of prior application Ser. No. 08/116,633, filed on Sep. 7, 1993, entitled "ARBITRATION PROTOCOL AND SYSTEM THEREFORE", abandoned.

RELATED APPLICATION

The present invention is related by subject matter to an application for U.S. Patent entitled "Arbitration Protocol System Granting Use of a Shared Resource to One of A Plurality of Resource Users" filed Sep. 3, 1993, Ser. No. 08/116,191 to Christopher Bryant et al.

FIELD OF THE INVENTION

The present invention generally relates to digital computing systems, and more specifically to a resource arbitration protocol.

BACKGROUND OF THE INVENTION

In many data processor applications, several devices may occasionally request the exclusive use of a single shared resource. The most common single shared resource in the field of digital computing systems is a shared communications bus. For example, a communications bus may interconnect a data processor, a memory subsystem, a video graphics driver subsystem and various input/output ("I/O") subsystems. Each of these devices may occasionally need to exclusively use the communications bus to transfer data between devices. Also, two or more of these devices may occasionally need to exclusively use the communications bus at the same time.

A resource arbitrator is a device that resolves simultaneous requests for a single resource according to a resource arbitration protocol. A resource arbitration protocol is a set of rules that specifies which resource user is granted the exclusive use of a particular resource given all possible combinations of requests for the resource. Therefore, a bus arbitrator resolves simultaneous requests for a single communications bus according to a bus arbitration protocol.

Arbitration protocols, in general, and bus arbitration protocols, in particular, are designed to treat all resource users equally. However, in some applications it is more critical that certain resource users have access to the shared resource before other resource users. In other cases, it may be more important that a member of a first group of resource users uses the shared resource before any member of a second group of resource users, where all resource users are in the first or second group.

SUMMARY OF THE INVENTION

In accordance with the present invention, there is disclosed an arbitration protocol which substantially eliminates disadvantages of prior arbitration protocols.

An arbitration protocol comprises the steps of receiving a first and a second plurality of resource request signals, and either, granting the shared resource to a selected one of a first plurality of resource users or granting the shared resource to a selected one of a second plurality of resource users. A differing one of each of a first plurality of resource users and of each of a second plurality of resource users generates a differing one of the first plurality of resource request signals and a differing one of the second plurality of resource request signals, respectively. Each one of the first and the second plurality of resource request signals corresponds to a first logic state if a particular one of the first or second plurality of resource users requests use of a shared resource. The shared resource is granted to a selected one of the first plurality of resource users according to a first arbitration protocol if at least one of the first plurality of resource request signals corresponds to the first logic state. The shared resource is granted to a selected one of the second plurality of resource users according to a second arbitration protocol if none of the first plurality of resource request signals corresponds to the first logic state and at least one of the second plurality of resource request signals corresponds to the first logic state.

In addition, an arbitration protocol system for granting use of a shared resource to a selected one of a first plurality of resource users or to a selected one of a second plurality of resource users has first arbitration circuitry, control circuitry and second arbitration circuitry coupled to the control circuitry. Each one of the first plurality of resource users asserts a differing one of a first plurality of resource request signals when requesting use of the shared resource. Each one of the second plurality of resource users asserts a differing one of a second plurality of resource request signals when requesting use of the shared resource. Each one of the second plurality of resource users de-asserts a differing one of a second plurality of resource request signals when not requesting use of the shared resource. The first arbitration circuitry receives the first plurality of resource request signals and grants use of the shared resource to a selected one of the first plurality of resource users according to a first arbitration protocol if at last one of the first plurality of resource request signals is asserted. The control circuitry receives the first and second plurality of resource request signals and generates a plurality of qualified resource request signals. A differing one of the plurality of qualified resource request signals is logically equivalent to a differing one of the second plurality of resource request signals if none of the first plurality of resource request signals is asserted. Each of the second plurality of resource request signals is logically equivalent to a de-asserted resource request signal if any of the first plurality if resource request signals is asserted. The second arbitration circuitry receives the plurality of qualified resource request signals and grants use of the shared resource to a selected one of the second plurality of resource users according to a second arbitration protocol.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
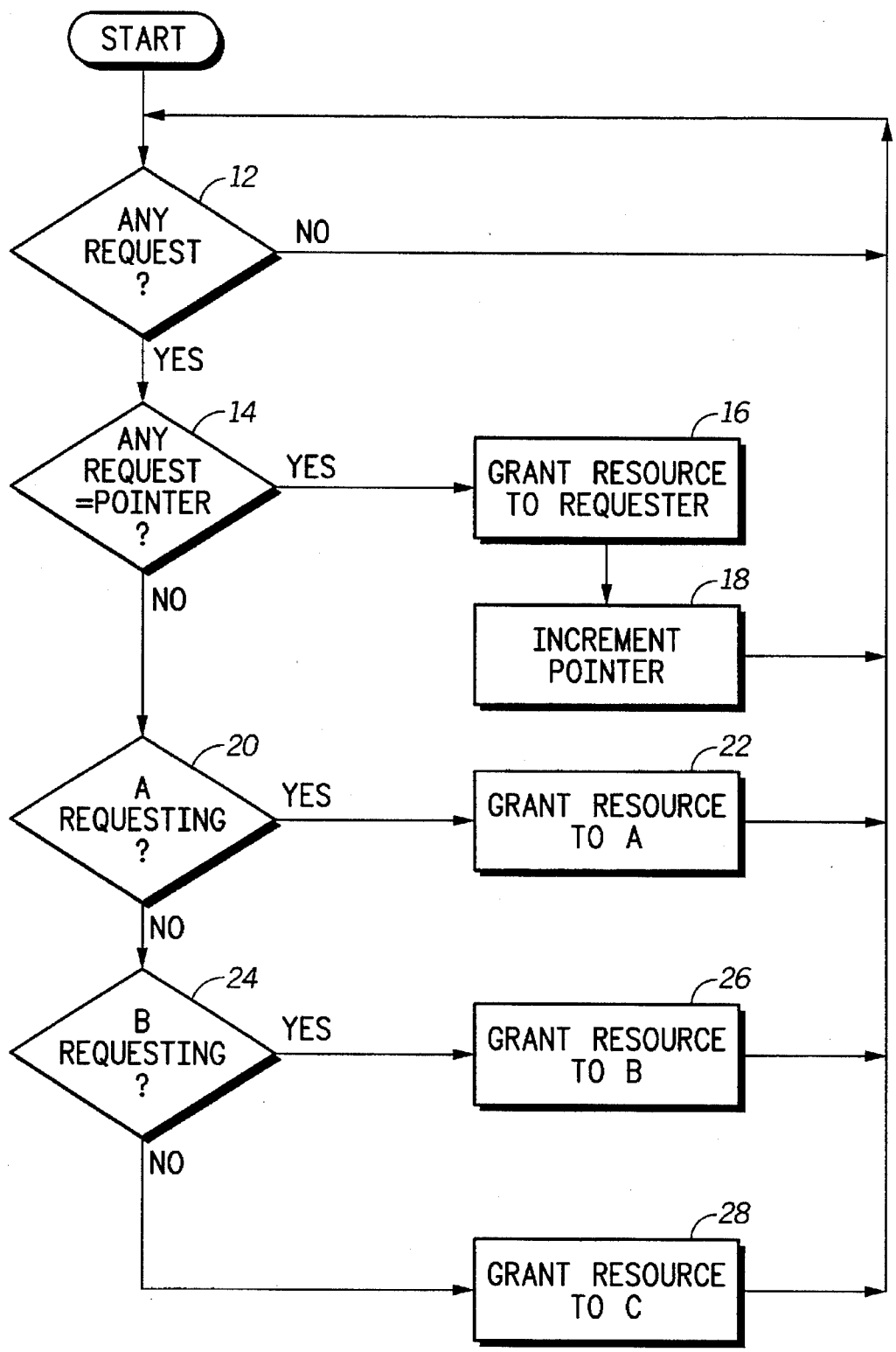
FIG. 1 depicts a flow chart of a first set of steps operable to implement a first invention.

FIG. 1 depicts a flow chart 10 of a first set of steps operable to implement a first invention. Flow chart 10 depicts a first resource arbitration protocol used to resolve simultaneous requests for a single resource. The first disclosed arbitration protocol is consistent with high resource bandwidth requirements and with fairness constraints. First, the disclosed arbitration protocol always assigns use of the bus to some requester if at least one subsystem is requesting use of the resource. An arbitrator that incorporates the disclosed arbitration protocol will never forgo resource use entirely to maintain fairness. Also, the disclosed arbitration protocol is a relatively simple algorithm. These two characteristics allow an arbitrator incorporating the disclosed arbitration protocol to operate at a high rate consistent with a high capacity resource. Second, the disclosed arbitration protocol is fair. No requester will ever be kept from the resource for more than N resource cycles, where N is the number of possible devices that may request use of the resource.

A set of rules defines the first arbitration protocol depicted in FIG. 1. The set of rules resolves which requester may use the resource for all possible combinations of requests. In the following illustration, there are three resource users, devices, subsystems, etc., A, B and C, that may request use of a shared resource. Typically, each of the three resource users will not request use of the common resource all the time. In addition, there may be occasions when none of the three resource users need to use the shared resource. The set of rules accounts for both of these situations and all possibilities falling in between these two extremes.

First, the arbitration protocol defines a rotating pointer. The pointer specifies a particular one of the resource users at a particular time. The arbitration protocol increments the pointer after an arbitrator incorporating the arbitration protocol grants the shared resource to the particular resource user specified by the pointer. The pointer cycles through all possible resource users in a cyclical fashion, eventually specifying every possible resource user. In the illustrated embodiment, the pointer initially specifies resource user A. The pointer will increment itself once the arbitrator grants the shared resource to resource user A. As will be described below, resource users B and C may use the shared resource before resource user A does. The pointer specifies resource user B immediately following resource user A. Again, the pointer will increment itself once the arbitrator grants the shared resource to resource user B. The pointer specifies resource user C immediately following resource user B. The pointer will increment itself again, returning to resource user A, once the arbitrator grants the shared resource to resource user C. This rotation continues, at various rates, as long as the arbitration protocol is in operation.

Second, the arbitration protocol defines a fixed priority protocol of all resource users relative to every other resource user. In the depicted embodiment, resource user A is senior to resource users B and C. Resource user B is senior to resource user C. There is no requirement that the fixed priority scheme mirror the sequential order of the pointer.

FIG. 1 depicts the interaction of the pointer and the fixed priority scheme described above. Flow chart 10 idles until it receives one or more requests for use of the shared resource, step 12. The arbitration protocol then determines if the resource user specified by the pointer is requesting use of the shared resource, step 14. If the pointer matches one of the requesters, then the arbitration protocol grants the resource to the resource user specified by the pointer, step 16. The arbitration protocol then increments the pointer to its next entry, step 18. A resource arbitrator incorporating flow diagram 10 returns to step 12 to await the next request for the shared resource. It should be understood that a resource arbitrator incorporating flow diagram 10 may execute other steps not related to the present invention before returning to step 12. For instance, these steps might involve determining if the shared resource was available for use by another requester.

If the pointer does not match one of the requesters, then the arbitration protocol grants the resource to the resource user according to the fixed priority scheme. In particular, a resource arbitrator incorporating flow diagram 10 determines if the senior-most resource user is requesting the resource, step 20. If the senior-most resource user, A, is requesting the resource, then the resource arbitrator grants the resource to A, step 22. If A is not requesting the resource, then the resource arbitrator determines if the second senior-most resource user, B, is requesting the resource, step 24. If B is requesting the resource, then the resource arbitrator grants the resource to B, step 26. Finally, if B is not requesting the resource, then the resource arbitrator grants the resource to C, step 28. (At this point C must be the resource user requesting use of the shared resource.) Flow diagram 10 returns to step 12 after executing any of steps 22, 26, or 28 to await the next request for the shared resource.

Figure 2:
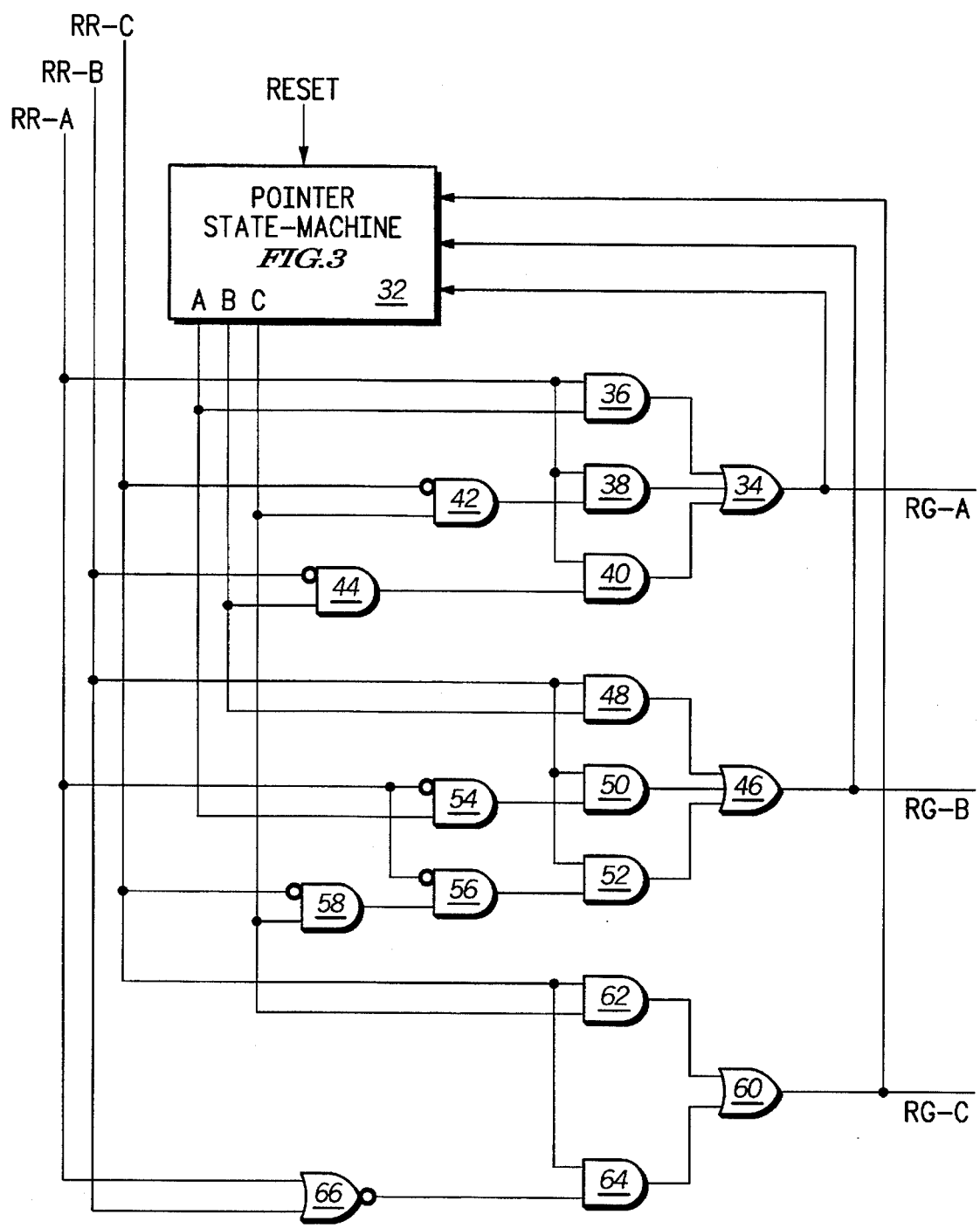
FIG. 2 depicts a block diagram of a resource arbitrator constructed in accordance with the flow chart illustrated in FIG. 1.

FIG. 2 depicts a block diagram of a resource arbitrator 30 constructed in accordance with flow chart 10 illustrated in FIG. 1. Such an arbitration protocol may be advantageously incorporated into a data processing system to temporarily assign ownership of a communications bus to one of a group of subsystems competing for use of the communications bus. Resource arbitrator 30 receives three resource request signals from resource users A, B, and C, labeled RR-A, RR-B and RR-C, respectively and a RESET signal. Each resource user asserts its corresponding resource request signal when it needs to use the shared resource. As described above, none, some, or all of the resource users may assert their resource request signal at a particular time. The RESET signal is a systems wide signal used to place all circuits in a known state at, for instance, power-up. Resource arbitrator 30 generates a resource grant signal for each of the resource users. Here, resource arbitrator 30 generates resource grant signals RG-A, RG-B and RG-C for resource users A, B and C, respectively. Resource arbitrator 30 asserts a resource grant signal to indicate that the corresponding resource user may use the shared resource. Consistent with the arbitration protocol depicted in FIG. 1, resource arbitrator 30 only asserts one or none of the resource grant signals at a time.

Resource arbitrator 30 has a pointer state machine 32 and the various logic gates depicted. Pointer state machine 30 receives the three resource grant signals, RG-A, RG-B and RG-C and the RESET signal. Pointer state machine 30 generates three pointing output signals, labeled A, B, and C. Pointer state machine 30 asserts one and only one of the three pointing signals to indicate the location of the pointer described above in connection with FIG. 1. Pointer state machine 30 is more fully described below in connection with FIG. 3.

An output of a three-input OR gate 34 generates the signal RG-A. A first input of OR gate 34 is connected to an output of an AND gate 36. A second input of OR gate 34 is connected to an output of an AND gate 38. A third input of OR gate 34 is connected to an output of an AND gate 40. A first input of AND gate 36 receives the resource request signal RR-A. A second input of AND gate 36 receives the pointing signal A. A first input of AND gate 38 receives the resource request signal RR-A. A second input of AND gate 38 is connected to an output of an AND gate 42. A first input of AND gate 42 receives the logical complement of the resource request signal RR-C. A second input of AND gate 42 receives the pointing signal C. A first input of AND gate 40 receives the resource request signal RR-A. A second input of AND gate 40 is connected to an output of an AND gate 44. A first input of AND gate 44 receives the logical complement of the resource request signal RR-B. A second input of AND gate 44 receives the pointing signal B.

An output of a three-input OR gate 46 generates the signal RG-B. A first input of OR gate 46 is connected to an output of an AND gate 48. A second input of OR gate 46 is connected to an output of an AND gate 50. A third input of OR gate 46 is connected to an output of an AND gate 52. A first input of AND gate 48 receives the resource request signal RR-B. A second input of AND gate 48 receives the pointing signal B. A first input of AND gate 50 receives the resource request signal RR-B. A second input of AND gate 50 is connected to an output of an AND gate 54. A first input of AND gate 54 receives the logical complement of the resource request signal RR-A. A second input of AND gate 54 receives the pointing signal A. A first input of AND gate 52 receives the resource request signal RR-B. A second input of AND gate 52 is connected to an output of an AND gate 56. A first input of AND gate 56 receives the logical complement of the resource request signal, RR-A. A second input of AND gate 56 is connected to an output of an AND gate 58. A first input of AND gate 58 receives the logical complement of the resource request signal RR-C. A second input of AND gate 54 receives the pointing signal C.

An output of a two-input OR gate 60 generates the signal RG-C. A first input of OR gate 60 is connected to an output of an AND gate 62. A second input of OR gate 60 is connected to an output of an AND gate 64. A first input of AND gate 62 receives the resource request signal RR-C. A second input of AND gate 62 receives the pointing signal C. A first input of AND gate 64 receives the resource request signal RR-C. A second input of AND gate 38 is connected to an output of an AND gate 42. A first input of AND gate 42 receives the logical complement of the resource request signal RR-C. A second input of AND gate 42 receives the pointing signal C.

Figure 3:
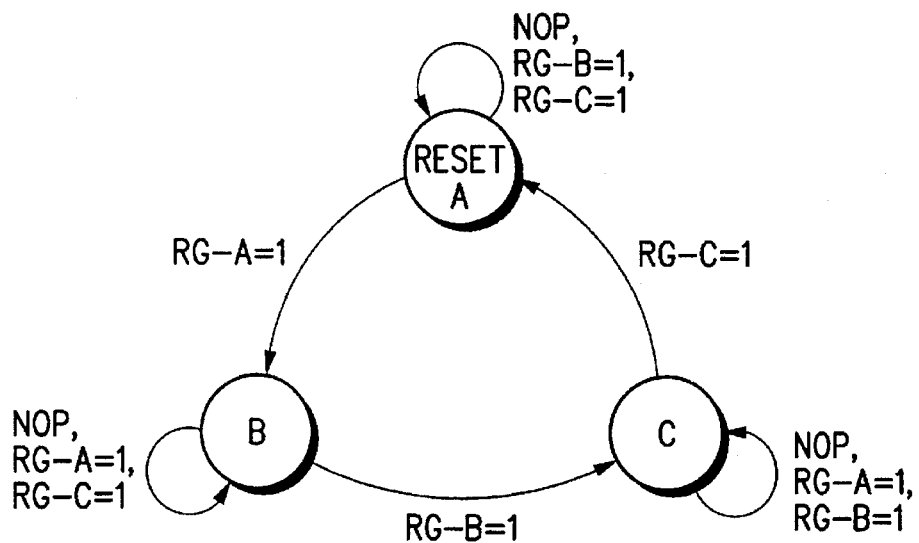
FIG. 3 depicts a state-transition diagram of the pointer state machine illustrated in FIG. 2.

FIG. 3 depicts a state-transition diagram of pointer state machine 32 illustrated in FIG. 2. Pointer state machine 32 asserts one of the three pointing output signals, A, B, or C, depending upon the states depicted in FIG. 3. The state of pointer state machine 32 during a particular resource clock cycle, in turn, is a function of the resource grant signals and of the state of pointer state machine 32 during the preceding resource clock cycle. Pointer state machine 32 has three states, labeled A, B, and C, associated with the generation of the pointing output signals. Pointer state machine 32 asserts the pointing output signal A when it is in state A. Pointer state machine 32 asserts the pointing output signal B when it is in state B. Pointer state machine 32 asserts the pointing output signal C when it is in state C.

Pointer state machine 32 resets to state A after the assertion of the control signal RESET. At each subsequent resource clock cycle, pointer state machine 32 attempts to change to an adjacent state. Pointer state machine 32 changes from state A to state B if resource arbitrator 30 asserts the resource grant signal, RG-A. Pointer state machine 32 remains in state A if resource arbitrator 30 asserts the resource grant signal, RG-B, if resource arbitrator 30 asserts the resource grant signal, RG-C, or if resource arbitrator 30 asserts no resource grant signal, labeled NOP. Pointer state machine 32 changes from state B to state C if resource arbitrator 30 asserts the resource grant signal, RG-B. Pointer state machine 32 remains in state B if resource arbitrator 30 asserts the resource grant signal, RG-A, if resource arbitrator 30 asserts the resource grant signal, RG-C, or if resource arbitrator 30 asserts no resource grant signal, labeled NOP. Pointer state machine 32 changes from state C to state A if the resource arbitrator 30 asserts the resource grant signal, RG-C. Pointer state machine 32 remains in state C if resource arbitrator 30 asserts the resource grant signal, RG-A, if resource arbitrator 30 asserts the resource grant signal, RG-B, or if resource arbitrator 30 asserts no resource grant signal, labeled NOP.

One skilled in the art of digital circuit design, in conjunction with the descriptions of FIGS. 1 through 3, may design a resource arbitrator with more than three resource users.

Figure 4:
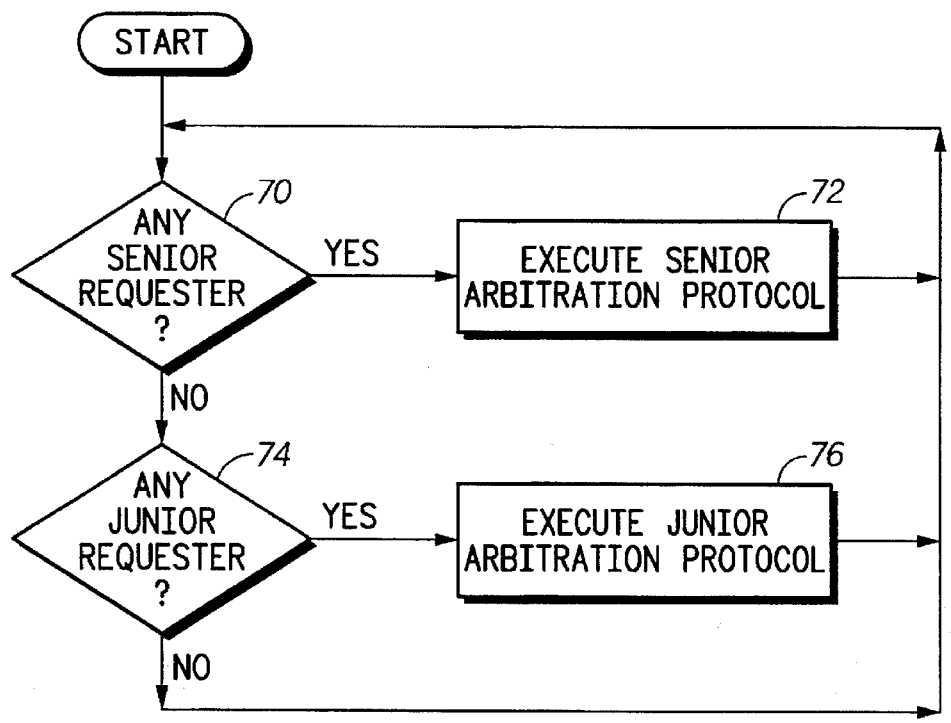
FIG. 4 depicts a flow chart of a set of steps operable to implement a second invention.

FIG. 4 depicts a flow chart 68 of a set of steps operable to implement a second invention. The second invention is a second resource arbitration protocol and a corresponding second resource arbitrator. The second resource arbitration protocol may be advantageously incorporated into a system in which the various resource users fall into two or more classes. The relative importance of each resource user in a class is generally equal. The relative importance of two resource users in different classes is different. The second arbitration protocol will grant use of the shared resource to a member of a selected one of the classes before it grants the shared resource to a member of any other class. In one embodiment of the second invention, some resource user will always have use of the shared resource if at least one resource user requests use of the shared resource. This embodiment is particularly suited to high resource bandwidth applications. For purposes of illustrating the second invention, the interaction of members of two classes will be described: a senior and a junior class. However, the second invention may be extended to incorporate more than two classes of resource users.

Continuing with FIG. 4, flow chart 68 first determines if any member of a first class of resource users is requesting use of the shared resource, step 70. For purposes of illustrating the second invention, a member of the first class that is requesting use of the shared resource is referred to as a "senior requester." If there are any senior requesters, then flow chart 68 executes a first resource arbitration protocol, step 72. This first resource arbitration protocol may be referred to as a "senior arbitration protocol". The senior arbitration protocol specifies which resource user is granted exclusive use of the resource given all possible combinations of senior requests for the resource. The senior arbitration scheme does consider requests for the resource from members of any other class of resource users. Flow chart 68 then returns to step 70 to await the next request for the shared resource. It should be understood that flow diagram 68 may execute other steps not related to the present invention before returning to step 70. For instance, these steps might involve determining if the shared resource was available for use by another requester.

If there are no senior requesters, then flow chart 68 determines if any member of a second class of resource users is requesting use of the shared resource, step 74. For purposes of illustrating the second invention, a member of the second class that is requesting use of the shared resource is referred to as a "junior requester." If there are any junior requesters, then flow chart 68 executes a second resource arbitration protocol, step 76. This second resource arbitration protocol may be referred to as a "junior arbitration protocol". The junior arbitration protocol specifies which resource user is granted exclusive use of the resource given all possible combinations of junior requests for the resource. The junior arbitration scheme does consider requests for the resource from members of any other class of resource users. Flow chart 68 then returns to step 70 to await the next request for the shared resource. It should be understood that flow diagram 68 may execute other steps not related to the present invention before returning to step 70. For instance, these steps might involve determining if the shared resource was available for use by another requester. Flow chart 68 also returns to step 70 to await the next request for the shared resource if there is no junior requester.

Figure 5:
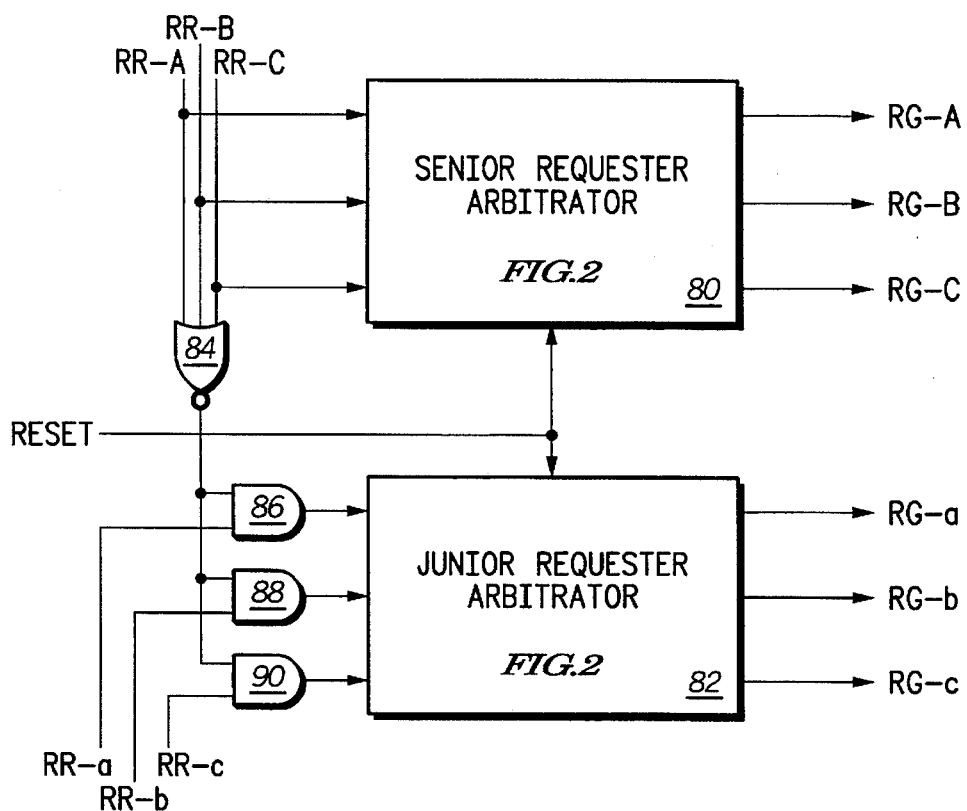
FIG. 5 depicts a block diagram of a resource arbitrator constructed in accordance with the flow chart illustrated in FIG. 4.

FIG. 5 depicts a block diagram of a resource arbitrator 78 constructed in accordance with flow chart 68 illustrated in FIG. 4. Resource arbitrator 78 receives six resource request signals from resource users A, B, C, a, b, and c, labeled RR-A, RR-B, RR-C, RR-a, RR-b, and RR-c, respectively, and the RESET signal described in connection with FIG. 2. Each resource user asserts its corresponding resource request signal when it needs to use the shared resource. As described above, none, some, or all of the resource users may assert their resource request signal at a particular time. Resource users A, B, and C are members of the first or senior class of resource users. Conversely, resource users a, b, and c are members of the second or junior class of resource users. There is no requirement that the two classes have the same number of members. Resource arbitrator 78 generates a resource grant signal for each of the resource users. Here, resource arbitrator 78 generates resource grant signals RG-A, RG-B, RG-C, RG-a, RG-b and RG-c for resource users A, B, C, a, b and c, respectively. Resource arbitrator 78 asserts a resource grant signal to indicate that the corresponding resource user may use the shared resource. Resource arbitrator 78 only asserts one or none of the resource grant signals at a time.

Resource arbitrator 78 has a first resource arbitrator 80, a second resource arbitrator 82, and the various logic gates depicted.

First resource arbitrator 80 receives three resource request signals from resource users A, B, and C, labeled RR-A, RR-B and RR-C, respectively and the RESET signal. First resource arbitrator 80 generates a resource grant signal for each of the three senior resource users. Hence, first resource arbitrator 80 is labeled senior requester arbitrator. Here, senior requester arbitrator 80 generates resource grant signals RG-A, RG-B and RG-C for resource users A, B and C, respectively. First resource arbitrator 80 asserts a resource grant signal to indicate that the corresponding resource user may use the shared resource consistent with a first arbitration protocol. The first resource arbitration protocol may be the protocol depicted in depicted in FIG. 1 or one of the protocols described below in connection with FIGS. 7 and 8.

Second resource arbitrator 82 receives three resource request signals from resource users a, b, and c, labeled RR-a, RR-b and RR-c, respectively and the RESET signal. The resource request signals are qualified as described below. Second resource arbitrator 82 generates a resource grant signal for each of the three junior resource users. Hence, second resource arbitrator 82 is labeled junior requester arbitrator. Here, junior requester arbitrator 82 generates resource grant signals RG-a, RG-b and RG-c for resource users a, b and c, respectively. Second resource arbitrator 82 asserts a resource grant signal to indicate that the corresponding resource user may use the shared resource consistent with a second arbitration protocol. The second resource arbitration protocol may be the protocol depicted in depicted in FIG. 1 or one of the protocols described below in connection with FIGS. 7 and 8.

The various logic gates depicted in FIG. 5 ensure that the proper requester arbitrator operates in the correct circumstances. In particular, if any member of the first group is requesting use of the shared resource (senior requester), then the first arbitrator 80 must grant the shared resource to one of the members of the first group according to the first arbitration protocol. If no senior requester is requesting use of the shared resource, then another arbitrator may grant the shared resource to a member of some other group according to some other arbitration protocol. In the depicted embodiment, there is only one other group and one other arbitration protocol: the second or junior group and the second or junior requester arbitrator 82. In this embodiment, junior requester arbitrator 82 may grant the shared resource to a member of the second class if no member of the first class is requesting the shard resource.

An output of a three-input NOR gate 84 is connected to a first input of an AND gate 86, to a first input of an AND gate 88, and to a first input of an AND gate 90. The output of NOR gate 84 qualifies each of the resource request signals, RR-a, RR-b, and RR-c. Junior requester arbitrator 82 receives these qualified resource request signals. A first input of NOR gate 84 receives the resource request signal RR-A. A second input of NOR gate 84 receives the resource request signal RR-B. A third input of NOR gate 84 receives the resource request signal RR-C. A second input of AND gate 86 receives the resource request signal RR-a. An output of AND gate 86 generates a qualified resource request signal for resource user a. A second input of AND gate 88 receives the resource request signal RR-b. An output of AND gate 88 generates a qualified resource request signal for resource user b. A second input of AND gate 90 receives the resource request signal RR-c. An output of AND gate 90 generates a qualified resource request signal corresponding to resource user c.

In a preferred embodiment of the second invention, the second resource arbitration protocol 68 depicted in FIG. 4 is incorporated in a data processor supporting a data coherency protocol. A data coherency protocol is a protocol that ensures data integrity when data may be modified by more than one device. Multi-processor data processing systems are examples of systems that incorporate data coherency protocols. Each data processor in a multi-processor data processing system may read data from a common memory sub-system and store the data in an internal storage device such as a high speed memory cache. Without a memory coherency protocol, the data processor may modify the data in its cache without accounting for the value of the data stored in the common memory sub-system or in another data processor's cache.

To ensure data integrity, a data coherency state is associated with each byte, half-word, word, double-word, etc. in the common memory sub-system. The data coherency state defines what rights each data processor has with respect to modifying and reading the data. Any operation to data must be consistent with the data coherency state of the data. A MESI protocol is one example of a data coherency protocol.

A data processor implementing a data coherency protocol monitors or "snoops" data transactions on a common communications bus. Conversely, a data processor implementing a data coherency protocol broadcasts all of its data transactions that affect data coherency states on the common communications bus. If a snooping data processor detects a data transaction affecting a byte, half-word, word, double-word, etc. in its internal memories, then it may take action to ensure data integrity. For instance, a first data processor may want to access data in the common memory sub-system that has been subsequently modified by a second data processor. The second data processor will monitor the communications bus and when it detects the data operation, it will assert a control signal indicating that the first data processor may not access the data. The second data processor will then write the modified data back to the common memory sub-system and change the data coherency state of the data. The first data processor may then access the updated data in the common memory sub-system at a later time. Also, the first data processor may want to modify data in the common memory sub-system that is in a second data processor but not yet modified. When the second data processor detects the data operation, it will invalidate its copy of the data so it will not rely on the data at a later time.

In a preferred embodiment, store operations waiting in a queue to access a communications bus are controlled by second arbitration protocol 68 depicted in FIG. 4. The store operations are divided into two classes corresponding to the senior and junior resource user classes described above. The senior resource user class contains all store operations performed in response to a data snoop, i.e. the data processor containing the queue has to update, or "push," its data to the common main memory sub-system to maintain data coherency. The junior resource user class contains all other store operations. It is critical that snoop push operations occur with little delay. Often, other devices connected to the communications bus have requested, but have been denied use of the bus until the push occurs. Conversely, the other data operations are dictated by software running on the data processor. No other data devices have are waiting for this type of operation to occur.

In the preferred embodiment, both the senior arbitration protocol step 72 and the junior arbitration protocol 76 are implemented by the arbitration protocol 10 depicted in FIG. 1. Therefore, in the preferred embodiment, no senior resource user will ever wait more than N bus clock cycles to use the communications bus, where N is the number of senior resource users. Also, second arbitration protocol 68 will always grant use of the bus to some resource user if any resource user is requesting use of the bus. Second arbitration protocol 68 is a fair, high bandwidth arbitration protocol.

Figure 6:
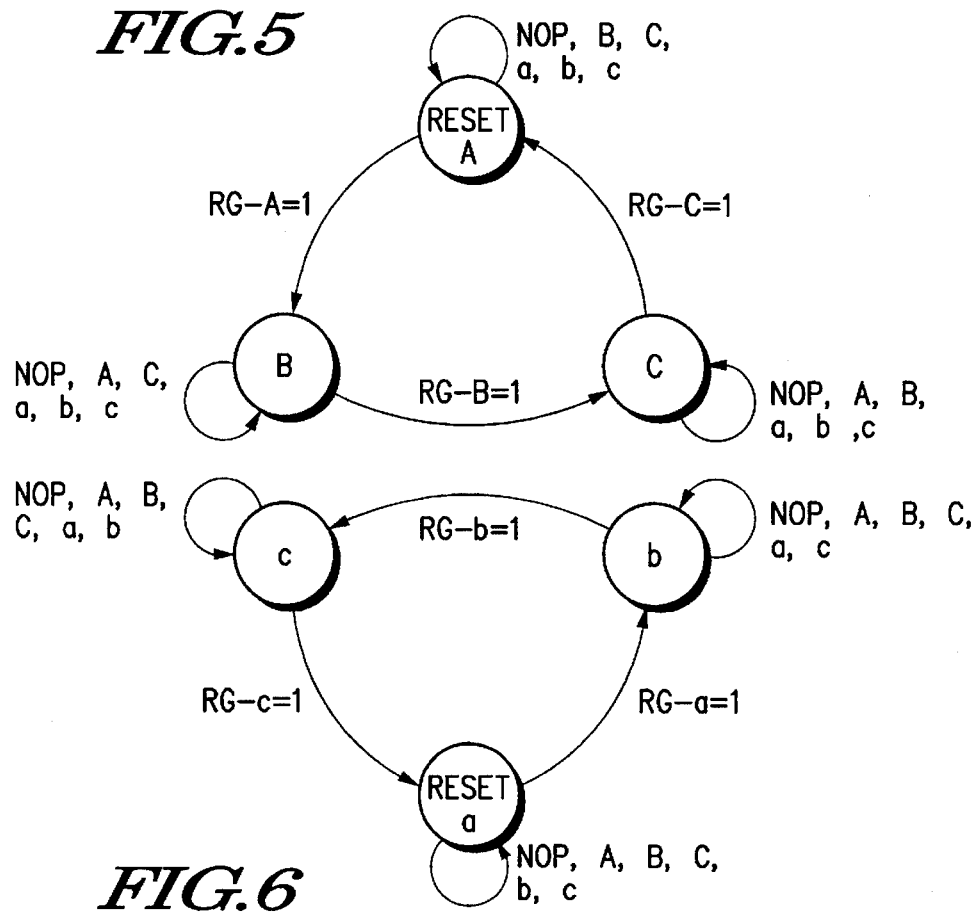
FIG. 6 depicts a state-transition diagram of the block diagram illustrated in FIG. 5.

FIG. 6 depicts a state-transition diagram of block diagram 68 illustrated in FIG. 5. In the preferred embodiment, both arbitration protocols use a pointer state machine similar to pointer state machine 32 described in connection with FIGS. 2 and 3. In the case of the preferred embodiment, the two pointer state machines transition between their respective states independent of each other. A resource request signal from resource user a, b, or c does not modify the state of the pointer state machine associated with the senior arbitration protocol. Conversely, a resource request signal from resource user A, B, or C does not modify the state of the pointer state machine associated with the junior arbitration protocol. (For purposes of clarity, the notation "RG-X=1" has been simplified to "X" in several places, where X may be replaced with A, B, C, a, b, or c.)

Figure 7:
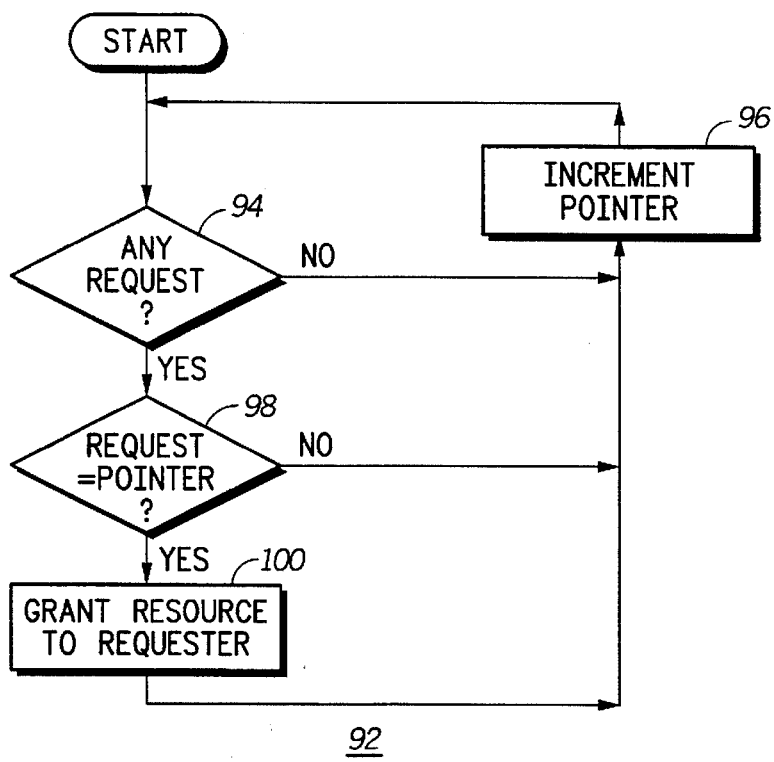
FIG. 7 depicts a flow chart of a second set of steps operable to implement a step depicted in FIG. 4.

FIG. 7 depicts a flow chart 92 of a second set of steps operable to implement step 72 or 76 depicted in FIG. 4. This arbitration protocol uses a rotating pointer that increments every resource clock cycle. The pointer specifies a particular one of the resource users at a particular time. The pointer cycles through all possible resource users in a cyclical fashion, eventually specifying every possible resource user. For example, the pointer initially specifies resource user A. The pointer specifies resource user B in the next resource clock cycle. The pointer specifies resource user C immediately after specifying resource user B. The pointer will return to resource user A after specifying resource user C. This rotation continues, at a constant rate, as long as the arbitration protocol is in operation. Flow chart 92 idles until it receives one or more requests for use of the shared resource, step 94. However, the pointer is incremented by one element for each idle resource clock cycle, step 96. Once a resource user makes a request, the arbitration protocol determines if the resource user specified by the pointer is one of the requesting users, step 98. If the pointer does not match one of the requesters, then the arbitration protocol increments the pointer, step 96. If the pointer matches one of the requesters, then the arbitration protocol grants the resource to the resource user specified by the pointer, step 100. The arbitration protocol then increments the pointer to its next entry, step 96. A resource arbitrator incorporating flow diagram 92 returns to step 94 to await the next request for the shared resource after incrementing its pointer, step 96.

Figure 8:
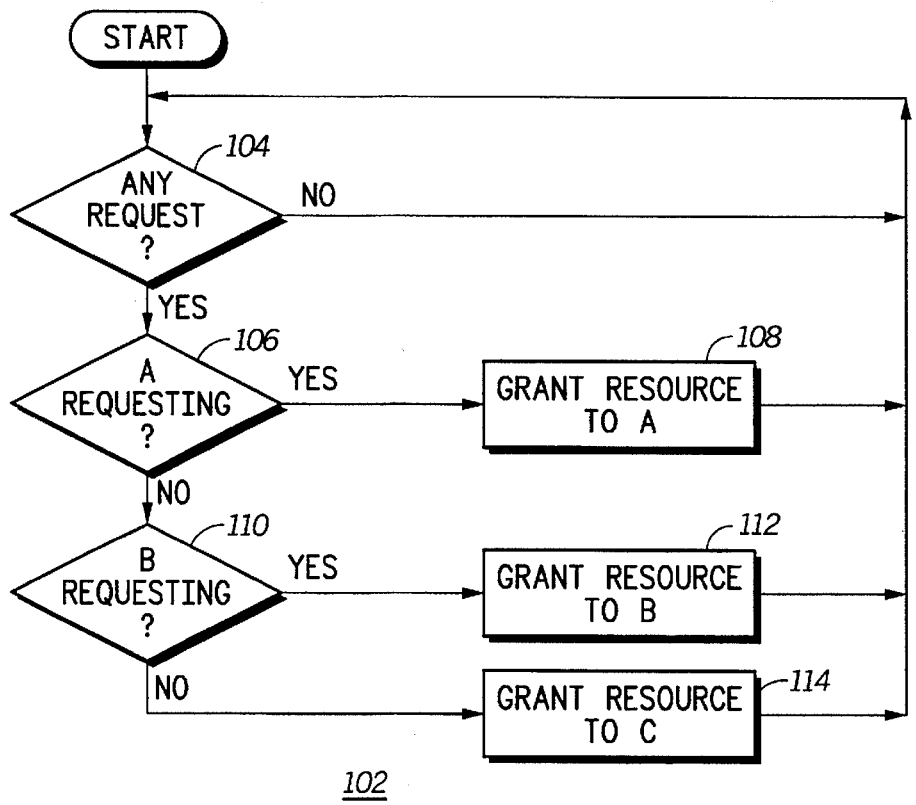
FIG. 8 depicts a flow chart of a third set of steps operable to implement a step depicted in FIG. 4.

FIG. 8 depicts a flow chart 102 of a third set of steps operable to implement step 72 or 76 depicted in FIG. 4. This arbitration protocol defines a fixed priority scheme of all resource users relative to every other resource user. In the depicted embodiment, resource user A is senior to resource users B and C. Resource user B is senior to resource user C. Flow chart 102 idles until it receives one or more requests for use of the shared resource, step 104. A resource arbitrator incorporating flow diagram 102 determines if the senior-most resource user is requesting the resource, step 106. If the senior-most resource user, A, is requesting the resource, then the resource arbitrator grants the resource to A, step 108. If A is not requesting the resource, then the resource arbitrator determines if the second senior-most resource user, B, is requesting the resource, step 110. If B is requesting the resource, then the resource arbitrator grants the resource to B, step 112. Finally, if B is not requesting the resource, then the resource arbitrator grants the resource to C, step 114. (At this point C must be the resource user requesting use of the shared resource.) Flow diagram 102 returns to step 104 after executing any of steps 108, 112, or 114 to await the next request for the shared resource.

Although the present invention has been described with reference to a specific embodiment, further modifications and improvements will occur to those skilled in the art. For instance, the first and second inventions were described in the context of a shared communications bus and three or six resources users, respectively. One skilled in the art, in conjunction with the preceding description, may use the disclosed inventions with other shared resources and with different numbers of shared resource users. It is to be understood therefore, that the invention encompasses all such modifications that do not depart from the spirit and scope of the invention as defined in the appended claims.

What is claimed is:

1. A priority arbitration system for granting use of a shared resource to a selected one of a first plurality of resource users or to a selected one of a second plurality of resource users, each one of the first plurality of resource users asserting a differing one of a first plurality of resource request signals when requesting use of the shared resource, each one of the second plurality of resource users asserting a differing one of a second plurality of resource request signals when requesting use of the shared resource, each one of the second plurality of resource users de-asserting a differing one of a second plurality of resource request signals when not requesting use of the shared resource, the arbitration protocol system comprising:

first priority arbitration circuitry for receiving a first plurality of resource request signals, the first arbitration circuitry granting use of a shared resource to a selected one of the first plurality of resource users according to a first priority arbitration protocol if at least one of the first plurality of resource request signals is asserted, the first priority arbitration circuitry comprising:

first pointer circuitry specifying one of the first plurality of resource users, the first pointer circuitry, sequentially specifying each of the first plurality of resource users according to a first predetermined order, the first pointer circuitry receiving a plurality of resource grant signals, the first pointer circuitry specifying a first selected one of the first plurality of resource users responsive to the first predetermined order and to the plurality of resource grant signals;

first circuitry coupled to the first pointer circuitry, the first circuitry generating a first one of the plurality of resource grant signals, the first circuitry asserting the first one of the plurality of resource grant signals if (1) the first one of the first plurality of resource request signals is asserted and (2) either (i) the first pointer circuitry specifies the first one of the first plurality of resource users, or (ii) the second one of the first plurality of resource request signals is not asserted and the first pointer circuitry specifies the second one of the first plurality of resource users, or (iii) the third one of the first plurality of resource request signals is not asserted and the first pointer circuitry specifies the third one of the first plurality of resource users;

second circuitry coupled to the first pointer circuitry, the second circuitry generating a second one of the plurality of resource grant signals, the second circuitry asserting the second one of the first plurality of resource grant signals if (1) the second one of the first plurality of resource request signals is asserted and (2) either (i) the first pointer circuitry specifies the second one of the first plurality of resource users, or (ii) the first one of the first plurality of resource request signals is not asserted and the first pointer circuitry specifies the first one of the first plurality of resource users, or (iii) the first one of the first plurality of resource request signals is not asserted, the third one of the first plurality of resource request signals is not asserted and the first pointer circuitry specifies the third one of the first plurality of resource users;

third circuitry coupled to the first pointer circuitry, the third circuitry generating a third one of the plurality of resource grant signals, the third circuitry asserting the third one of the plurality of resource grant signals if (1) the third one of the first plurality of resource request signals is asserted and (2) either (i) the first pointer circuitry specifies the third one of the first plurality of resource users, or (ii) neither the first one or the second one of the first plurality of resource request signals is asserted;

second priority arbitration circuitry for receiving a second plurality of resource request signals, the second arbitration circuitry granting use of the shared resource to a selected one of the second plurality of resource users according to a second priority arbitration protocol, the second priority arbitration circuitry comprising:

second pointer circuitry specifying one of the second plurality of resource users, the second pointer circuits sequentially specifying each of the second plurality of resource users according to a second predetermined order, the second pointer circuitry receiving the plurality of resource grant signals, the second pointer circuitry specifying a first selected one of the second plurality of resource users responsive to the second predetermined order and to the plurality of resource grant signals;

fourth circuitry coupled to the second pointer circuitry, the fourth circuitry generating a fourth one of the plurality of resource grant signals, the fourth circuitry asserting the fourth one of the plurality of resource grant signals if (1) none of the first, second, or third resource grant signals are asserted, (2) the first one of the second plurality of resource request signals is asserted and (3) either (i) the second pointer circuitry specifies the first one of the second plurality of resource users, or (ii) the second one of the second plurality of resource request signals is not asserted and the second pointer circuitry specifies the second one of the second plurality of resource users, or (iii) the third one of the second plurality of resource request signals is not asserted and the second pointer circuitry specifies the third one of the second plurality of resource users;

fifth circuitry coupled to the second pointer circuitry, the fifth circuitry generating a fifth one of the plurality of resource grant signals, the fifth circuitry asserting the fifth one of the plurality of resource grant signals if (1) none of the first, second, or third resource grant signals are asserted, (2) the second one of the second plurality of resource request signals is asserted and (3) either (i) the second pointer circuitry specifies the second one of the second plurality of resource users, or (ii) the first one of the second plurality of resource request signals is not asserted and the second pointer circuitry specifies the first one of the second plurality of resource users, or (iii) the first one of the second plurality of resource request signals is not asserted, the third one of the second plurality of resource request signals is not asserted and the second pointer circuitry specifies the third one of the second plurality of resource users; and sixth circuitry coupled to the second pointer circuitry, the sixth circuits generating a sixth one of the plurality of resource grant signals, the sixth circuitry asserting the sixth one of the plurality of resource grant signals if (1) none of the first, second, or third resource grant signals are asserted, (2) the third one of the second plurality of resource request signals is asserted and (3) either (i) the second pointer circuitry specifies the third one of the second plurality of resource users, or (ii) neither the first one or the second one of the second plurality of resource request signals is asserted.

* * * * *

UNITED STATES PATENT AND TRADEMARK OFFICE
CERTIFICATE OF CORRECTION

PATENT NO. : 5,649,206
DATED      : July 15, 1997
INVENTOR(S) : Michael S. Allen It is certified that error appears in the above-identified patent and that said Letters Patent is hereby corrected as shown below:

Column 12, line 54, change "circuits" to --circuitry--.

Signed and Sealed this

Tenth Day of March, 1998

Attest:

BRUCE LEHMAN

*Attesting Officer*          *Commissioner of Patents and Trademarks*